US007278504B2

(12) United States Patent
Smith et al.

(10) Patent No.: US 7,278,504 B2
(45) Date of Patent: Oct. 9, 2007

(54) INTEGRATED FAN SHROUD AIR INTAKE SYSTEM

(75) Inventors: Ellis Junior Smith, Rock Hill, SC (US); Paul Michael Elhardt, Evans, GA (US)

(73) Assignee: Deere & Company, Moline, IL (US)

( * ) Notice: Subject to any disclaimer, the term of this patent is extended or adjusted under 35 U.S.C. 154(b) by 361 days.

(21) Appl. No.: 10/972,937

(22) Filed: Oct. 25, 2004

(65) Prior Publication Data

US 2006/0086549 A1 Apr. 27, 2006

(51) Int. Cl.
*B60K 13/02* (2006.01)

(52) U.S. Cl. .................... 180/68.3; 180/68.4; 180/68.2

(58) Field of Classification Search ............... 180/68.1, 180/68.2, 68.3, 68.4, 68.6
See application file for complete search history.

(56) References Cited

U.S. PATENT DOCUMENTS

| | | | | | |
|---|---|---|---|---|---|
| 2,197,503 | A | * | 4/1940 | Martin | 123/198 E |
| 2,708,920 | A | * | 5/1955 | Pasturczak | 123/198 E |
| 5,277,157 | A | | 1/1994 | Teich | 123/198 |
| 5,427,502 | A | | 6/1995 | Hudson | 415/211.1 |
| 5,564,513 | A | * | 10/1996 | Wible et al. | 180/68.3 |
| 5,921,214 | A | * | 7/1999 | Fujita et al. | 123/198 E |
| 6,648,089 | B1 | * | 11/2003 | Wooldridge et al. | 180/68.4 |
| 6,698,539 | B2 | * | 3/2004 | Decuir | 180/68.3 |
| 6,732,784 | B2 | * | 5/2004 | Dion | 165/41 |
| 6,878,178 | B2 | * | 4/2005 | Schulze et al. | 55/385.3 |
| 6,907,854 | B2 | * | 6/2005 | Wikner | 123/198 E |
| 6,976,825 | B2 | * | 12/2005 | Wikner | 415/211.1 |

* cited by examiner

*Primary Examiner*—Christopher P. Ellis
*Assistant Examiner*—John D Walters

(57) ABSTRACT

An integrated fan shroud air intake system for a tractor provides an air passage through a fan shroud positioned between the radiator and internal combustion engine. The air passage has an intake and an outlet laterally displaced from the intake. An air filter is mounted transversely to the longitudinal axis of the tractor, with a dirty air inlet plugged directly into the outlet of the air passage.

20 Claims, 4 Drawing Sheets

INTEGRATED FAN SHROUD AIR INTAKE SYSTEM

FIELD OF THE INVENTION

This invention relates generally to air intake systems for combustion air for utility vehicles such as tractors, and more specifically to mounting air intake system components in the engine compartment under the front hood of a small tractor.

BACKGROUND OF THE INVENTION

Packaging space for under-hood components of compact tractors is very limited. Packaged components include the air intake system, exhaust system, fuel supply system, engine cooling system, HVAC system, and electrical system. It is desirable to provide easy access to frequently serviced items in the engine compartment such as the engine air filter, fuel filter, oil level fill and check, coolant water level check, etc. It also would be desirable to perform frequent service activities without special tools, and without having to remove components that are not being serviced.

One such component that requires service is the air intake filter for combustion air. Performance of the air intake system affects the power output of an internal combustion engine. For example, power output may be reduced if the air intake system allows entry of heat and/or moisture into the inlet air during its path through the intake system inside of the engine compartment. Additionally, power output may be reduced if the air intake system permits a pressure drop of the air flow traveling through the intake system. Air intake systems typically have several components and connections that potentially allow entry of heat or moisture, or pressure drops due to air leaks.

There is a need for an air intake system for a compact tractor or similar vehicle that requires less space under the hood. There is a need for an air intake system that helps improve power output of an internal combustion engine by minimizing the entry of heat and/or moisture into the inlet air. There is a need for an air intake system that has fewer components, connectors, and potential leak paths. There is a need for an air intake system that is less costly to assemble and service.

SUMMARY OF THE INVENTION

The integrated fan shroud air intake system provides an air passage through the cooling system fan shroud of a compact tractor upstream of the air filter. The air filter is mounted directly to the fan shroud in an alignment transverse to the longitudinal axis of the vehicle. The air filter inlet is plugged directly into the fan shroud. The integrated fan shroud air intake system reduces air filter mounting costs, improves serviceability of the air filter, reduces intake plumbing, reduces heat added to the inlet air, and improves packaging efficiency of the air filter.

DESCRIPTION OF A PREFERRED EMBODIMENT

Figure 1:
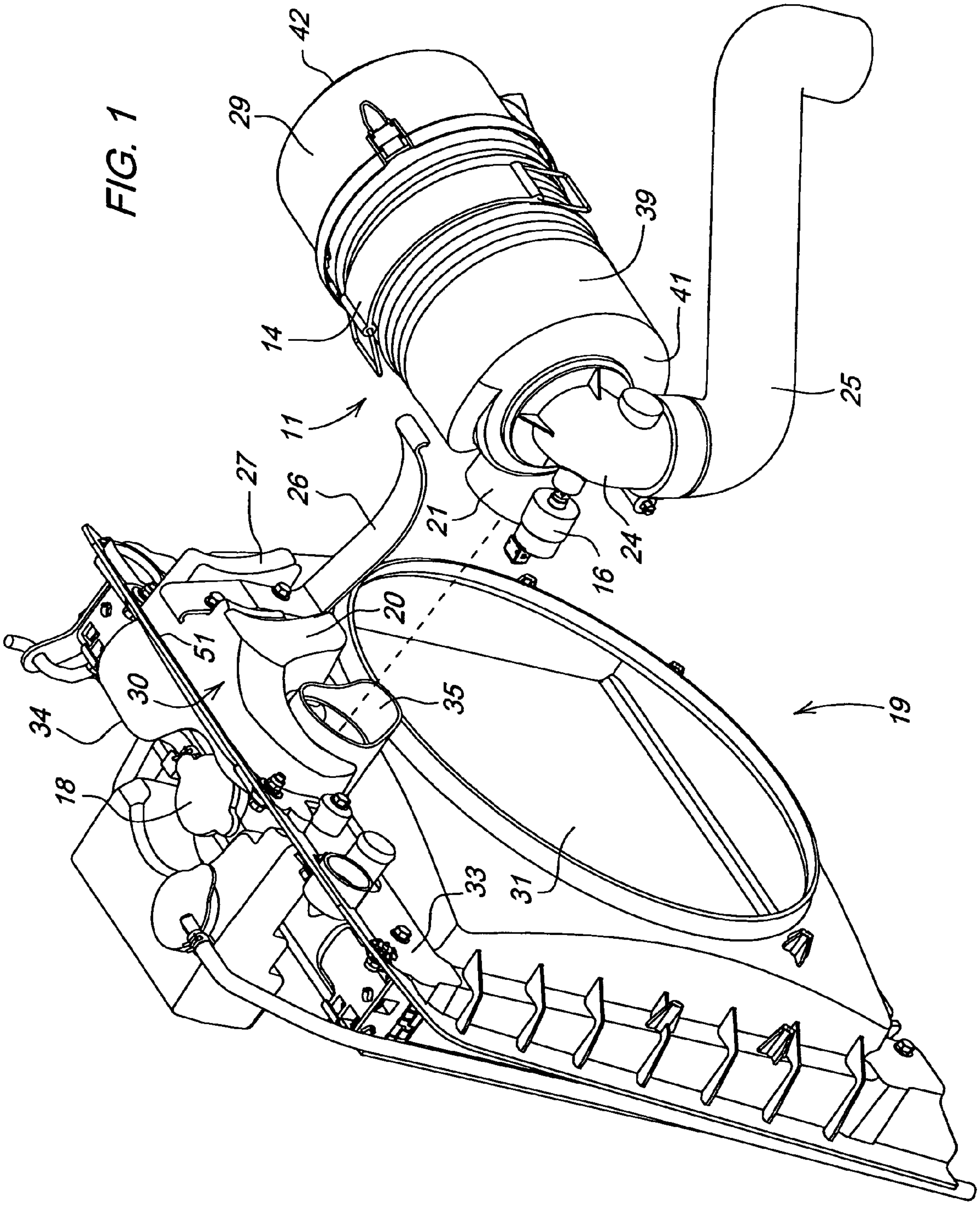
FIG. 1 is a partially exploded perspective view of the integrated fan shroud air intake system according to one embodiment of the invention.
Figure 2:
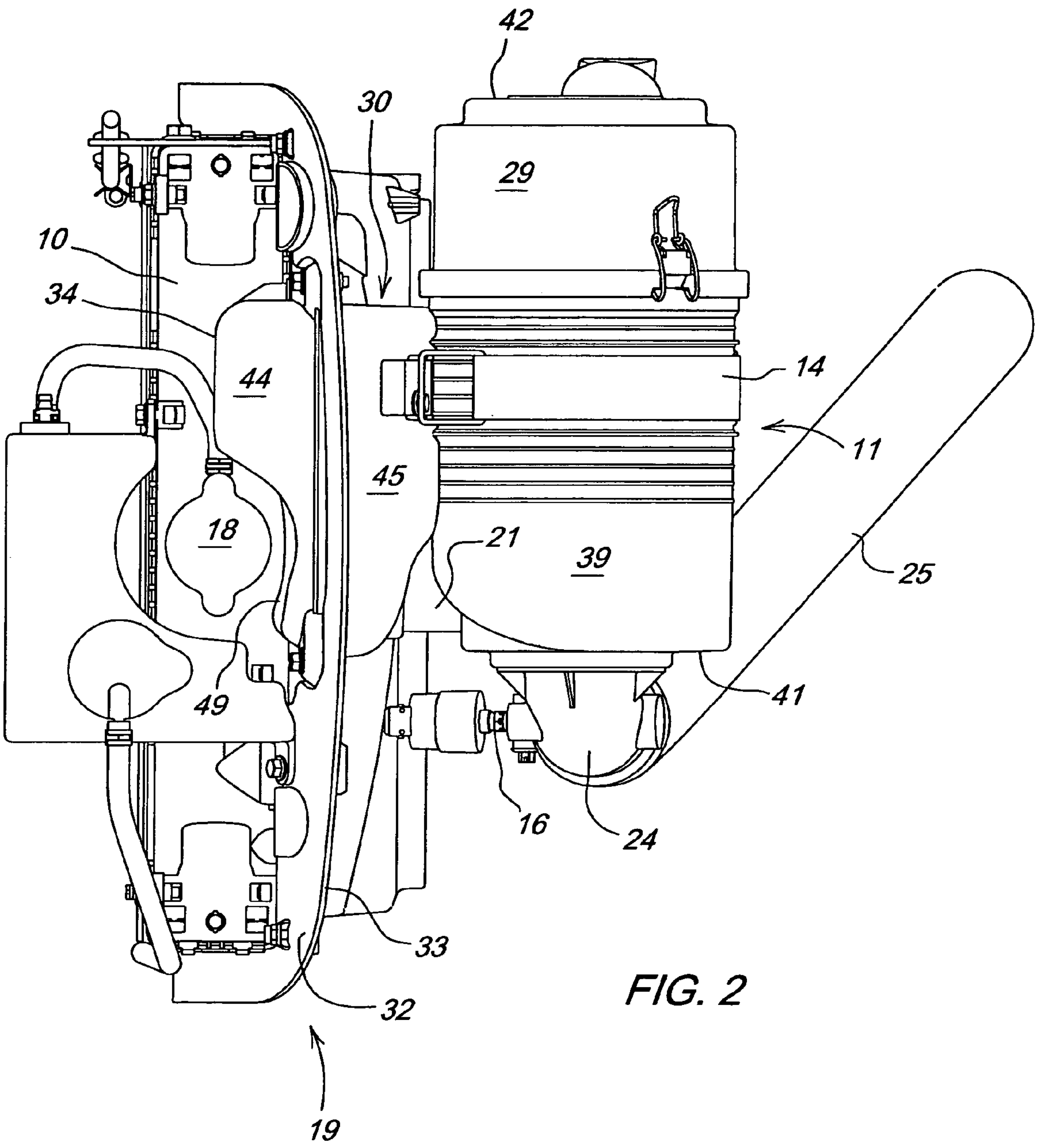
FIG. 2 is a top view of the integrated fan shroud air intake system according to one embodiment of the invention.

In one embodiment, the integrated fan shroud air intake system may be used in a small or compact tractor, but also may be used in other work vehicles such as off-road or mowing vehicles. The integrated fan shroud air intake system receives and filters a sufficient volume of air for fuel combustion in an internal combustion engine. The integrated fan shroud air intake system requires less space under the hood than previous systems, helps improve power output of the internal combustion engine by minimizing the entry of heat and/or moisture into the intake air, and has fewer components, connectors, and potential leak paths than previous air intake systems. Additionally, the integrated fan shroud air intake system is less costly to assemble and service.

In one embodiment, as shown in FIGS. 1-4, the integrated fan shroud air intake system provides an air passage through the cooling system fan shroud 19 of a compact tractor. Air filter 11 is mounted directly to the fan shroud in an alignment transverse to the longitudinal axis of the vehicle.

In one embodiment, radiator 10 and fan shroud 19 are positioned in front of and adjacent to an internal combustion engine under a tractor hood. The fan shroud has a first face 32 that may be attached or fastened to the radiator, and a second face 33 that faces the engine. The fan shroud may have a generally cylindrical or circular central opening 31 that may surround a cooling fan (not shown) that rotates on a generally longitudinal axis. The fan may be driven by an internal combustion engine, or may be electrically or hydraulically powered, and may have a plurality of blades which rotate to cause air to move through a radiator.

The radiator and fan shroud may have a generally vertical alignment, or may be at an angle of less than about 30 degrees from vertical. In one embodiment, at least part of the radiator may be aluminum, copper or bronze material, with a releasable radiator cap 18. The fan shroud may be molded or formed from a polymeric material such as glass fiber mineral reinforced, highly chemically coupled polypropylene. The fan shroud may have a nominal material wall thickness of between about 2 mm and about 10 mm, and most preferably about 3.5 mm. Alternatively, the fan shroud may be formed of sheet metal.

In one embodiment, air filter 11 may be mounted to second face 33 of the fan shroud at or near the uppermost edge 51 of the fan shroud. When mounted to the fan shroud, the air filter may be aligned so that the axis of cylindrical housing 39 is transverse to the longitudinal axis of the vehicle. In one embodiment, releasable securing hardware, such as strap 14 and bracket 26, may extend at least partially around the cylindrical housing of the air filter and help secure the housing to the fan shroud. The securing hardware allows the air filter to be easily removed and re-attached manually for replacement, servicing or cleaning.

In one embodiment, passage 30 extends through fan shroud 19 upstream of the air filter. Passage 30 may be positioned at or near the uppermost edge 51 of the fan shroud. At least part of passage 30 may be transverse to the longitudinal axis of the vehicle, providing for a lateral air flow path. Passage 30 extends through the fan shroud and/or may project from one or both faces of the fan shroud. Passage 30 may have a small orifice at the lower surface thereof for removal of entrapped water from the system. In one embodiment, passage 30 may include a plenum having an internal volume of between about 0.01 cubic meters and about 0.1 cubic meters.

In one embodiment, the passage and/or plenum may have an air intake and an outlet. Intake 34 may project from the first face of the fan shroud at or near the uppermost edge of the fan shroud. Outlet 35 may project from the second face of the fan shroud at or near the uppermost edge. Intake 34 may be laterally spaced from outlet 35. For example, intake 34 may be spaced laterally between about 1 cm and about 20 cm from outlet 35. At least one of the intake 34 and outlet 35 may be integral with and molded together with the fan shroud. The intake 34 and outlet 35 each may project between about 1 cm and about 10 cm from the respective faces of the fan shroud. Intake 34 may have a generally oblong flange in cross section, and outlet 35 may have a generally cylindrical flange.

Figure 3:
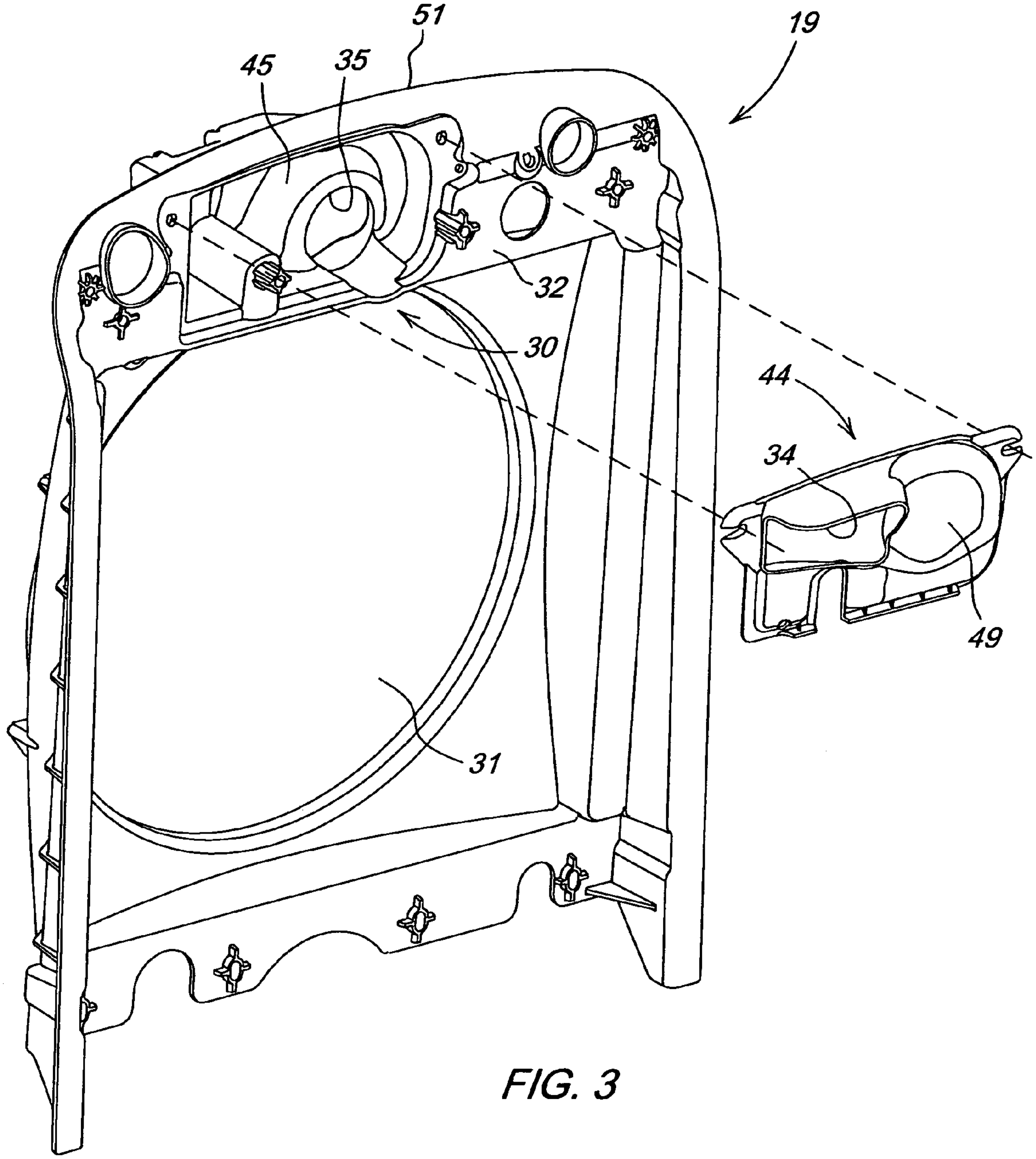
FIG. 3 is an exploded perspective view of one embodiment of the fan shroud used in the integrated fan shroud air intake system.
Figure 4:
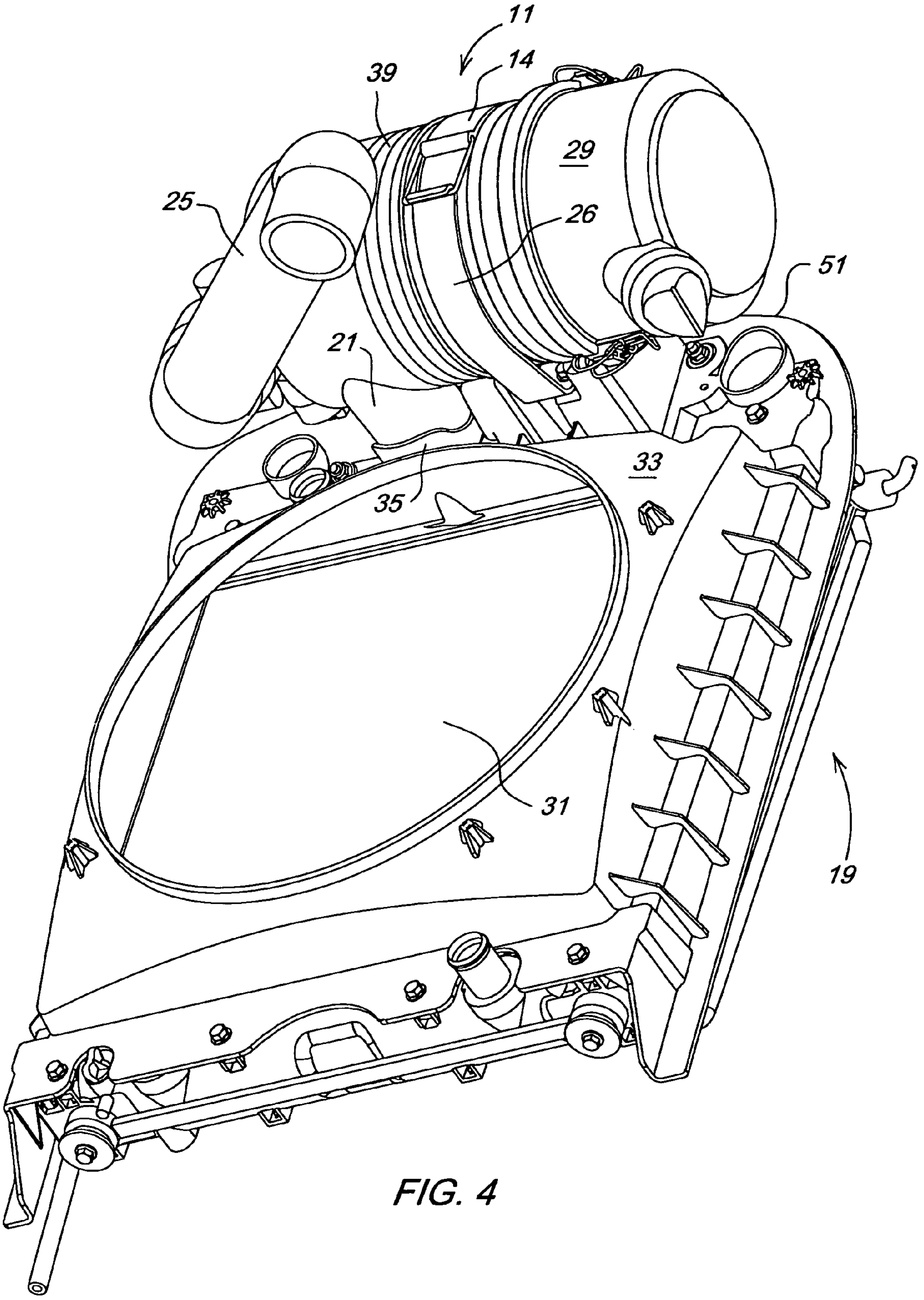
FIG. 4 is a rear perspective view of the integrated fan shroud air intake system according to one embodiment of the invention.

In one embodiment, as shown in FIG. 3, the passage may include a plenum between cover 44 and fan shroud panel 45. For example, a plenum may be provided by attaching cover 44 to fan shroud panel 45 with threaded fasteners. Intake 34 may extend through cover 44, and outlet 35 may extend through panel 45. Cover 44 also may have an outwardly facing cavity 49 to provide adequate room for manual access to radiator cap 18. Cover 44 should prevent water entering the passage or plenum either from the engine cooling system or from pressure washing of the vehicle cooling system. Cover 44 may be removable to allow cleaning of any debris trapped within the plenum.

In one embodiment, one or more air filter mounting ribs 20, 27 may project from the second face of the fan shroud and/or plenum. Mounting ribs 20, 27 may be shaped or contoured to match and correspond to the housing or outer surface of air filter 11, helping to position and secure the air filter to the fan shroud. For example, mounting ribs 20, 27 may have arced surfaces to match the cylindrical housing 39 of air filter 11.

In one embodiment, cylindrical housing 39 may have a first end 41 and a second end 42, and cover 29 releasably attached to the second end. Dirty air inlet 21 may be adjacent the first end 41. Dirty air may enter the air filter through inlet 21 and be filtered with filtration elements before exiting through clean air outlet 24. In one embodiment, inlet 21 may be transverse to and extend outwardly from the cylindrical body of the housing. Dirty air inlet 21 may plug directly into outlet 35 extending from the second face of the fan shroud, and may have a snug fit to allow manual insertion or removal from outlet 35 without tools. For example, inlet 21 may have an external diameter the same or not more than about 5 mm less than the internal diameter of outlet 35.

In one embodiment, clean air outlet 24 may extend axially from first end 41 of the air filter housing. Valve 16 in the clean air outlet may be operable to control and/or restrict the air flow. Outlet 24 may be secured to hose 25 with a conventional clamping device, which routes clean filtered air to one or more fuel delivery components of the internal combustion engine.

The integrated fan shroud air intake system may be serviced by raising the vehicle engine compartment cover, removing the air filter housing cover and then removing the filtration elements. Advantages of the system may include reduced air filter mounting costs, improved serviceability of the air filter, reduced intake plumbing, reduced heat added to the inlet air, and improved packaging efficiency of the air filter. The improved packaging efficiency may allow additional space for other engine compartment components such as air conditioning, fuel tank, etc.

Having described the preferred embodiment, it will become apparent that various modifications can be made without departing from the scope of the invention as defined in the accompanying claims.

The invention claimed is:

1. An apparatus comprising:

a tractor having a longitudinal axis, an internal combustion engine, a radiator positioned in a generally vertical alignment adjacent the internal combustion engine, and a fan shroud positioned between the radiator and the internal combustion engine;

an air passage extending through the fan shroud, the air passage having an intake and an outlet laterally displaced from the intake; and an air filter having a housing mounted directly to the fan shroud and having a dirty air inlet plugged directly into the outlet of the air passage.

2. The apparatus of claim 1 wherein the air passage includes a plenum having a volume between about 0.01 cubic meters and 0.10 cubic meters.

3. The apparatus of claim 1 wherein the outlet of the air passage is integral with the fan shroud.

4. The apparatus of claim 1 wherein the air passage comprises a panel integral with the fan shroud and a cover removably attached to the panel.

5. The apparatus of claim 1 wherein the fan shroud has at least one mounting rib having a shape matching the air filter housing.

6. The apparatus of claim 1 wherein the air filter housing is cylindrical.

7. The apparatus of claim 1 wherein the intake and outlet project from the fan shroud at least about one cm.

8. An apparatus comprising:

a fan shroud having a first face and a second face, an air passage between the first face and second face, the air passage having an intake projecting from the first face and an outlet projecting from the second face, at least one of the intake and outlet being integral with the fan shroud; and an air filter mounted directly to the second face of the fan shroud, the air filter having a cylindrical housing and a dirty air inlet extending transversely from the cylindrical housing adjacent a first end thereof, the dirty air inlet plugged directly into the outlet of the air passage.

9. The apparatus of claim 8 wherein the air passage extends laterally between the intake and the outlet.

10. The apparatus of claim 8 further comprising a panel that is integral with the fan shroud and a cover removably attached to the panel, the panel and the cover forming a plenum.

11. The apparatus of claim 10 wherein the intake extends through the cover and the outlet extends through the panel.

12. The apparatus of claim 8 further comprising at least one air filter mounting rib integral with the fan shroud, the at least one air filter mounting rib having a shape corresponding to the cylindrical air filter housing.

13. The apparatus of claim 8 wherein the air filter housing has a first end and a second end, the dirty air inlet and clean air outlet positioned near the first end, and a cover removably attached to the second end.

14. An integrated fan shroud air intake system for a tractor having a longitudinal axis, the system comprising:

a radiator having a fan shroud attached thereto, the fan shroud having a first face and a second face;

an air passage having an intake on the first face, an outlet on the second face, and a plenum between the intake and outlet, at least part of the plenum and at least one of the intake and outlet being integral with the fan shroud; and an air filter having an inlet plugged directly into the outlet of the air passage, and a cylindrical housing mounted directly to the second face of the fan shroud transversely to the longitudinal axis of the tractor.

15. The integrated fan shroud air intake system of claim 14 wherein the air filter inlet extends transversely from the cylindrical housing.

16. The integrated fan shroud air intake system of claim 14 wherein the plenum provides a lateral air flow path having a length of between about 1 cm and about 20 cm.

17. The integrated fan shroud air intake system of claim 14 wherein the fan shroud is a polymeric material.

18. The integrated fan shroud air intake system of claim 14 further comprising a plurality of mounting ribs integral with the fan shroud corresponding to the shape of the cylindrical housing.

19. The integrated fan shroud air intake system of claim 14 wherein the plenum comprises a panel integral with the fan shroud and a cover removably attached to the panel.

20. The integrated fan shroud air intake system of claim 14 wherein the intake and the outlet extend from each face of the fan shroud between about 1 cm and about 10 cm.

* * * * *